US008225231B2

(12) United States Patent
Zielinski et al.

(10) Patent No.: US 8,225,231 B2
(45) Date of Patent: Jul. 17, 2012

(54) AGGREGATION OF PC SETTINGS

(75) Inventors: Tobiasz A. Zielinski, Redmond, WA (US); Ravipal S. Soin, Sammamish, WA (US); Kamesh C. Tumsi Dayakar, Redmond, WA (US); William Mak, Seattle, WA (US); Guy Barker, Kirkland, WA (US); Jennifer R. Stallard, Redmond, WA (US); Ryan E. Cukierman, Redmond, WA (US); Christopher M. Hahn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1244 days.

(21) Appl. No.: 11/215,052

(22) Filed: Aug. 30, 2005

(65) Prior Publication Data

US 2007/0067737 A1  Mar. 22, 2007

(51) Int. Cl.
*G06F 3/048* (2006.01)

(52) U.S. Cl. .................................. 715/810; 715/809
(58) Field of Classification Search .................. 715/810, 715/809
See application file for complete search history.

(56) References Cited

U.S. PATENT DOCUMENTS

| 5,640,176 | A  | * | 6/1997  | Mundt et al. ........................ 715/839 |
| 5,754,174 | A  | * | 5/1998  | Carpenter et al. ................. 715/810 |
| 6,009,519 | A  | * | 12/1999 | Jones et al. ............................ 713/1 |
| 6,724,403 | B1 | * | 4/2004  | Santoro et al. ..................... 715/765 |
| 7,600,189 | B2 | * | 10/2009 | Fujisawa ............................ 715/765 |
| 2005/0044058 | A1 | * | 2/2005 | Matthews et al. ..................... 707/1 |
| 2008/0028294 | A1 | * | 1/2008 | Sell et al. ......................... 715/234 |
| 2008/0141153 | A1 | * | 6/2008 | Samson et al. ................... 715/769 |
| 2009/0030998 | A1 | * | 1/2009 | Blagsvedt et al. .............. 709/206 |

OTHER PUBLICATIONS

-"Windows XP in 10 Steps or Less", by Bill Hatfield, published 2004 by John Wiley & Sons.*
"Ron's VB Forum" taken from http://oreilly.com, published Apr. 8, 2003, pp. 1-5.*
"Windows XP Professional: A Beginner's Guide Essential Skills Made Easy", by Matthews, published by McGaw-Hill PRofessional, in 2003, pp. c, iii, iv, 387.*

* cited by examiner

Primary Examiner — William Bashore
Assistant Examiner — Gregory A Distefano
(74) Attorney, Agent, or Firm — Wolfe-SBMC

(57) ABSTRACT

Systems and methods for enabling users to roam between networking environments are disclosed. In one embodiment, different machine settings may be stored in a memory for different network locations under separate network profiles. In another embodiment, these and other settings may be automatically adjusted upon entering a different location. In one such embodiment, a logical network may be employed to determine which settings are adjusted. Another aspect relates to a graphical user interface to implement the above and other methods of adapting a computing device to different network locations. In one embodiment, a graphical use interface may allow the use to modify which application and which aspects of those applications are displayed on the menu. In still yet another embodiments, a memory can update a network profile as the changes occur. In still yet further embodiments, the user may derive or otherwise create new network profiles from existing network profiles. Another aspect relates to systems and methods that allow a user to configure various settings explicitly for different network locations by means of a consolidated UI.

17 Claims, 8 Drawing Sheets

AGGREGATION OF PC SETTINGS

BACKGROUND

In recent years, computer systems have become increasingly mobile. A recent study indicated over 24% of U.S. households own at least one laptop computer. In an attempt to meet this demand, original equipment manufacturers ("OEMs") have introduced "laptop class" mice and other mobile specific hardware peripherals that are generally more compact than their desktop counterparts. While such advances have gently improved mobile computing, adequate mobile software components are lagging. One illustration of this lag is readily apparent to users when they attempt to quickly and efficiently alter computer settings when at various locations. The problem is not isolated with mobile computers as even with stationary computing environments, rapidly adjusting common settings may become an arduous task.

Currently, in many computing environments, the operating system and machine settings are scattered in various control panels ("CPLs") throughout the system, often in distinct and incompatible graphical user interfaces. In most instances, these settings are not in obvious and discoverable locations. For example, one software application may require the use to first execute the entire application, select an options menu and manually adjust a setting, while another may still then require the user to adjust another related setting in a central settings depot, such as Control Panel in Microsoft® Windows® operating system. Indeed, even once a user accesses Control Panel, they must still navigate through numerous options to alter the desired setting.

In contrast, the great majority of mobile uses change the environment and context around their machines, and therefore need to modify settings on an on-going basis to adapt to changing conditions and locations; and navigating constantly between the scattered settings UI is tedious and annoying.

SUMMARY

Aspects of the invention relate to a readily discoverable, consolidated UI of frequently modified application and system settings. In one aspect, systems and methods may be deployed to efficiently adjust mobile settings. In one embodiment, tiles configured to represent the an application and include at least one icon, the status of the application, and a user-selectable display element, such as a button, for positioning thin each tile, wherein the user can adjust the aspect with a single input to the user selectable display element. In yet another embodiment, the user may select another user-selectable user display element to adjust further aspects of the application.

Another aspect relates to a graphical user interface to implement the above and other collections of tiles to more easily allow a user to view the current status of an aspect of several applications and to adjust an aspect of each element by providing a single input. In one embodiment, a graphical user interface may allow the user to modify which application and which aspects of those applications are displayed on the menu. In yet another embodiment, additional aspects of the applications may be viewed and adjusted through an additional sub-menu by the use of an additional display element, such as a button.

Another aspect relates to a method that may be instituted to determine which applications and/or elements of applications are to be displayed within the menus. In one embodiment, application data may be generated that considers one or more of the following exemplary data categories: the power source of the computer, applications presently active on the computer, the networking environment, applications most utilized on the computer, applications most likely to be utilized on the computer; and/or applications requiring the most frequent adjustment.

A more complete understanding of the present invention and the advantages thereof may be acquired by referring to the following description in consideration of the accompanying drawings, in which like reference numbers indicate like features, and wherein:

DETAILED DESCRIPTION

Exemplary Operating Environment

Figure 1A:
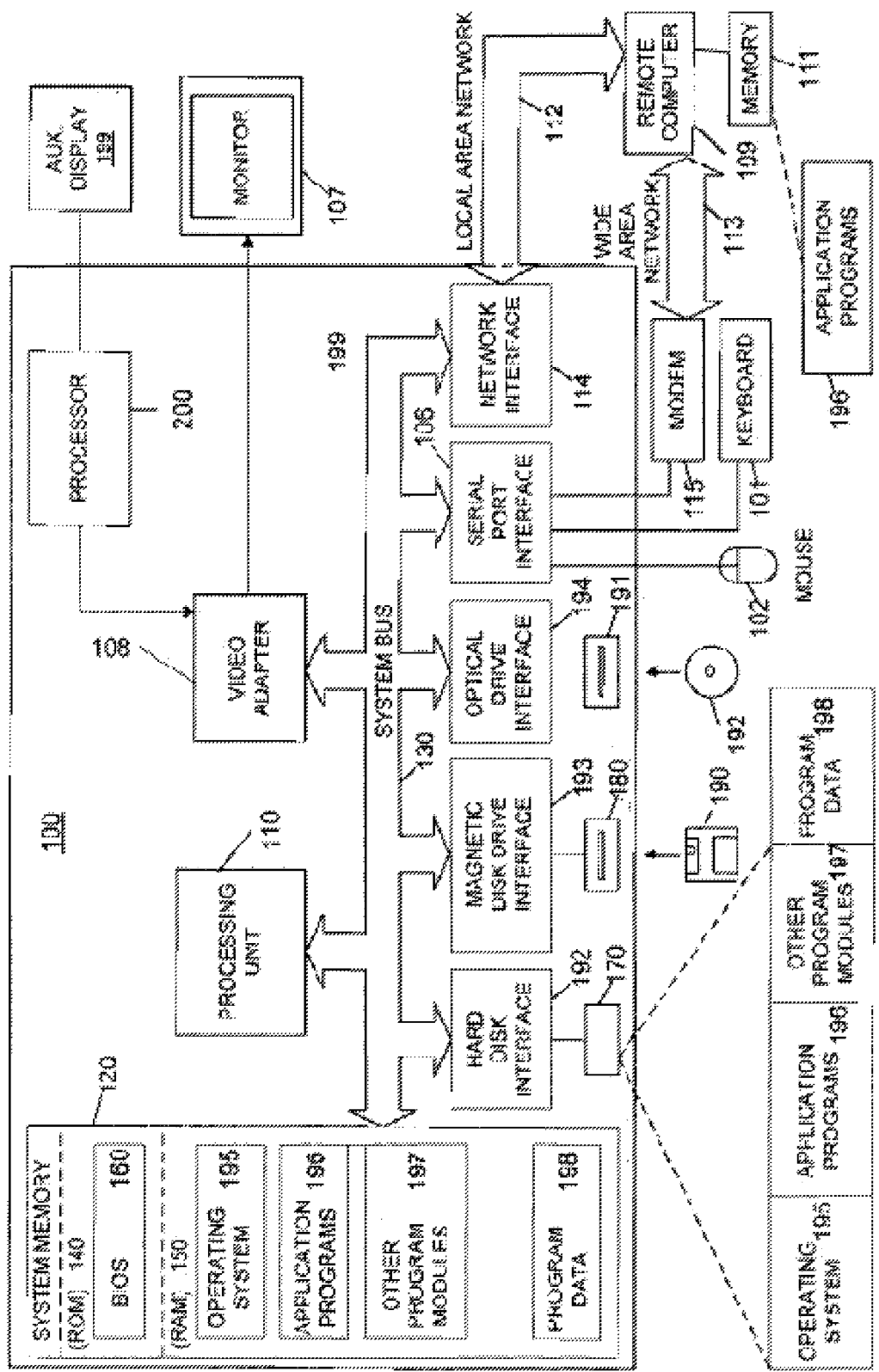
FIG. 1A illustrate a schematic diagram of a general-purpose digital computing environment in which certain aspects of the present invention may be implemented.

FIG. 1A is a functional block diagram of an example of a conventional general-purpose digital computing environment that can be used in connection with various embodiments of the present invention. In FIG. 1A, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 10.

A basic input/output system 160 (BIOS), containing the basic routines that help to transfer information between elements within the compute 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data struts, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application program 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input dec are often connected to the processing until 110 through a serial port interface 106 that is coupled to the system bus, but may be connected by other interfaces, such as a parallel port, game port or a universal serial bus (USB). The illustrated computer 100 includes an optional PCMCIA interface 103 that may connect at least one embodiment of an input device according to the present invention to the computer 100. Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1A. The logical connections depicted in FIG. 1A include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory store ice.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provide by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
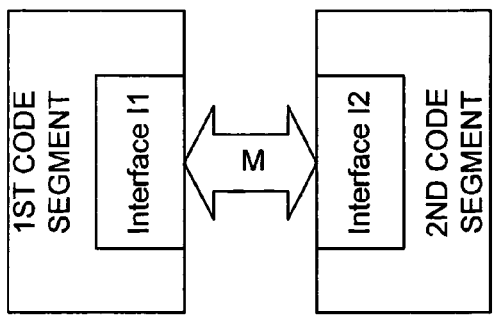
FIGS. 1B through 1M show a general-purpose a environment supporting one or more aspects of the present invention
Figure 1E:
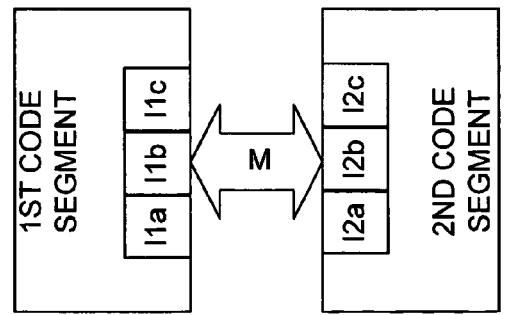
Figure 1B:
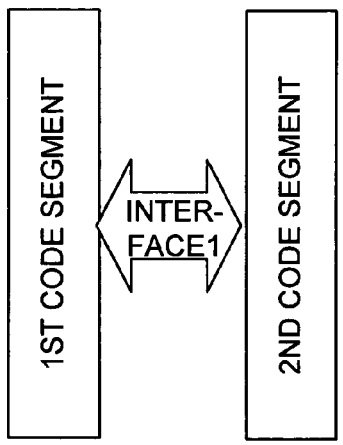

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interface of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point method, function, subroutine, remote procedure call, and component object model (COM) interface, are encompassed within the definition of programming interface.

Aspects of such a programming interface may include the method whereby the first code segment transmits information (where "information" is used in its broadest sense and includes data, command, requests, etc.) to the second code segment; the method whereby the second code segment receives the information; and the structure, sequence, syntax, organization, schema, tiring and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanic (e.g. information placed in a buffer, file, etc. separate from information flow between the code segments) or non-existent, as when one code segment simply accesses functionality performed by a second code segment. Any or all of these aspects may be import in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these to are intended to be encompassed by the claims set forth at the end of this specification. Such other ways may appear to be more sophisticated or complex then the simplistic view of FIGS. 1B and 1C, but they nonetheless perform a similar function to accomplish the same overall result. We will now briefly describe some illustrative alternative implementations of a programming interface.

A. Factoring

Figure 1D:
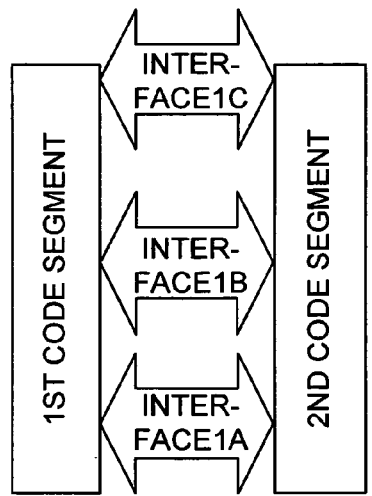

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the inter functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interface Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1G:
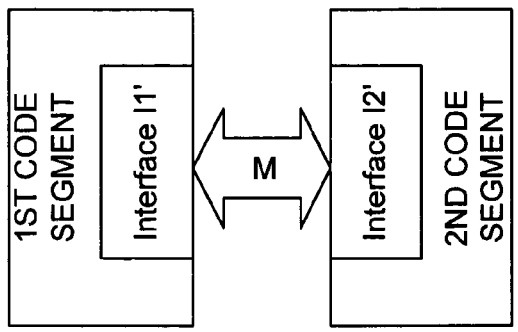
Figure 1I:
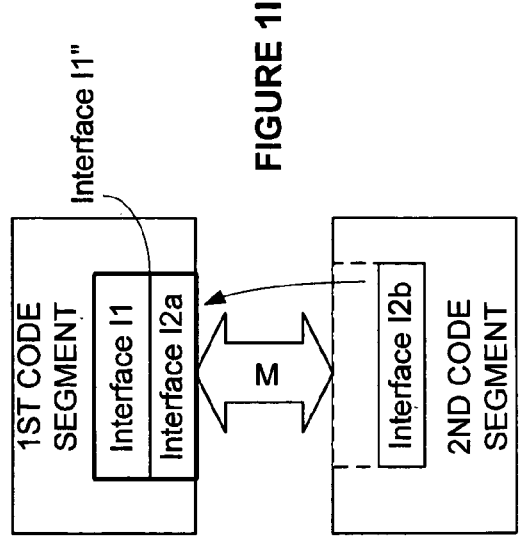
Figure 1F:
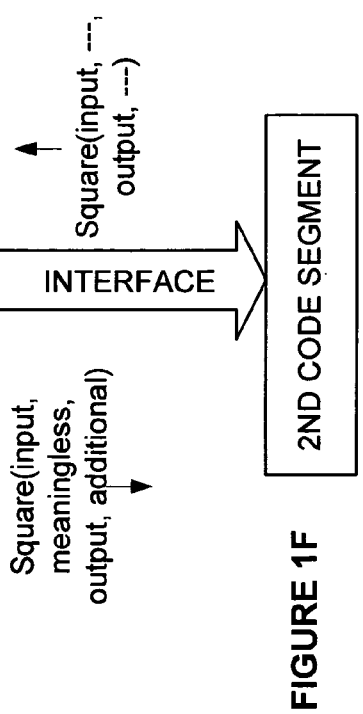

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, in of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
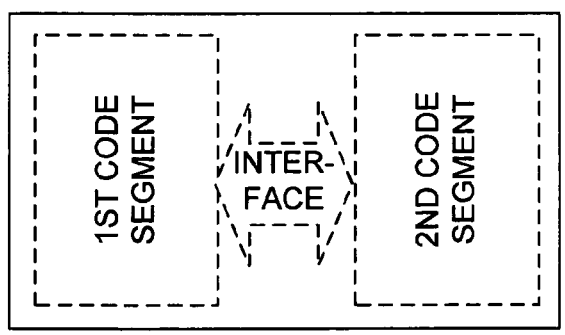

It may also be feasible to map some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface Interface1 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code set passes back the squared result with output. In such a case, the processing performed by the second code segment (squaring input) can be performed by the first code segment without a call to the interface.

D. Divorce

Figure 1K:
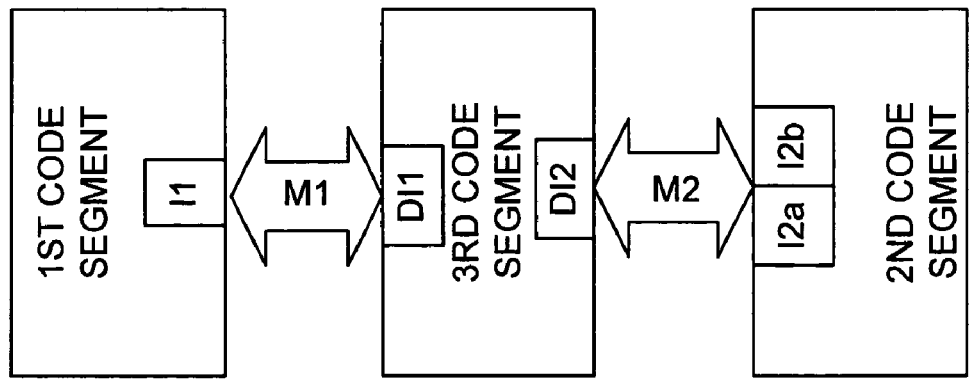
Figure 1J:
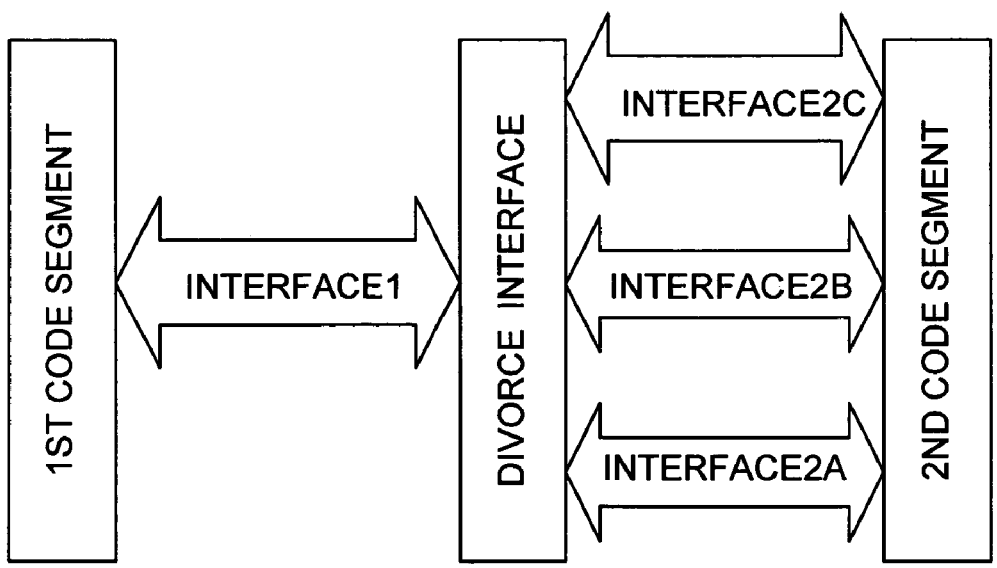

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where here is an installed base of applications designed to communicate with, say, an operating system in accordance with an Interface1 protocol, but then the operating system is changed to use a different interface, in this case in interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the or similar functional result.

E. Rewriting

Figure 1L:
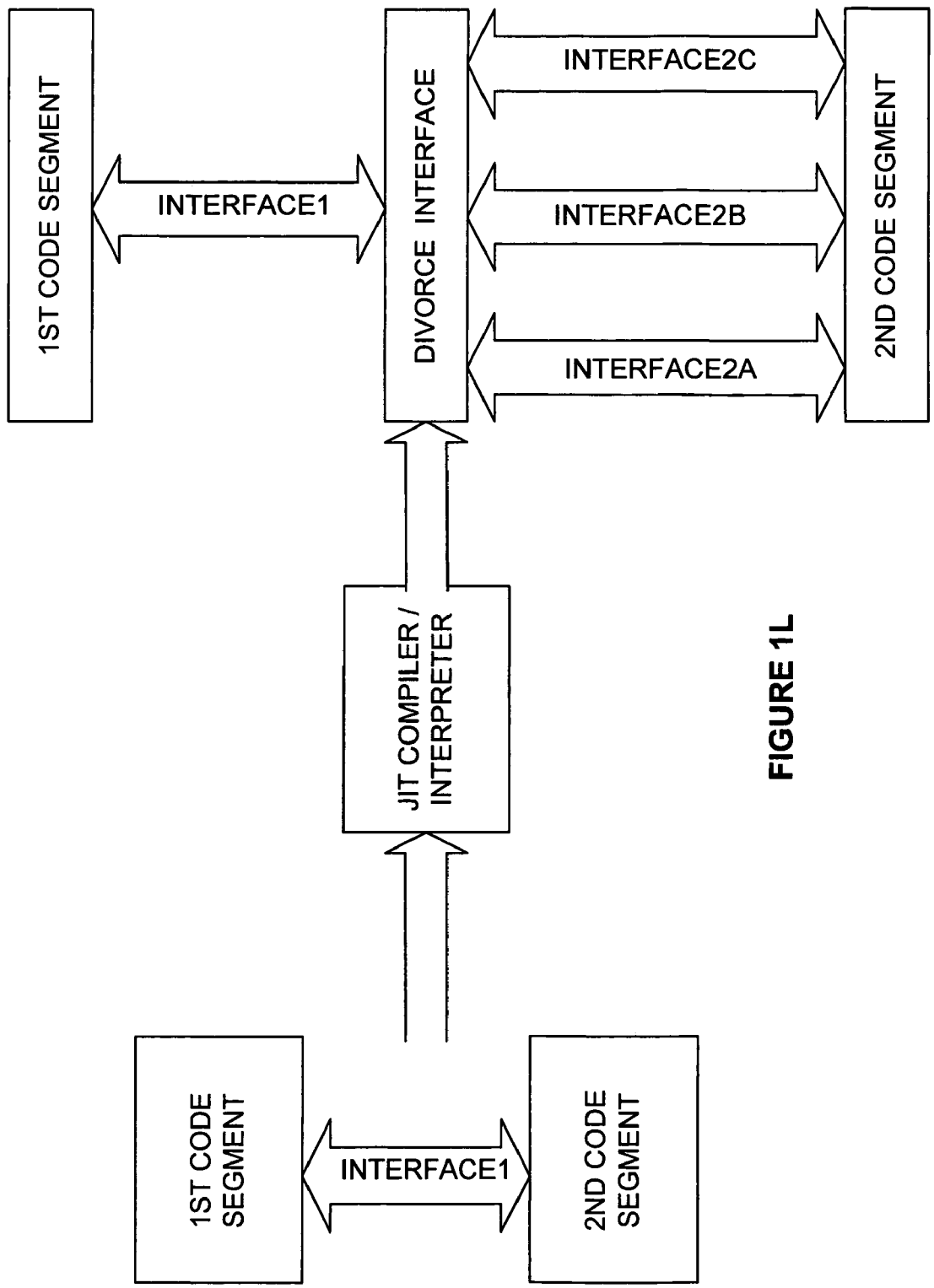
Figure 1M:
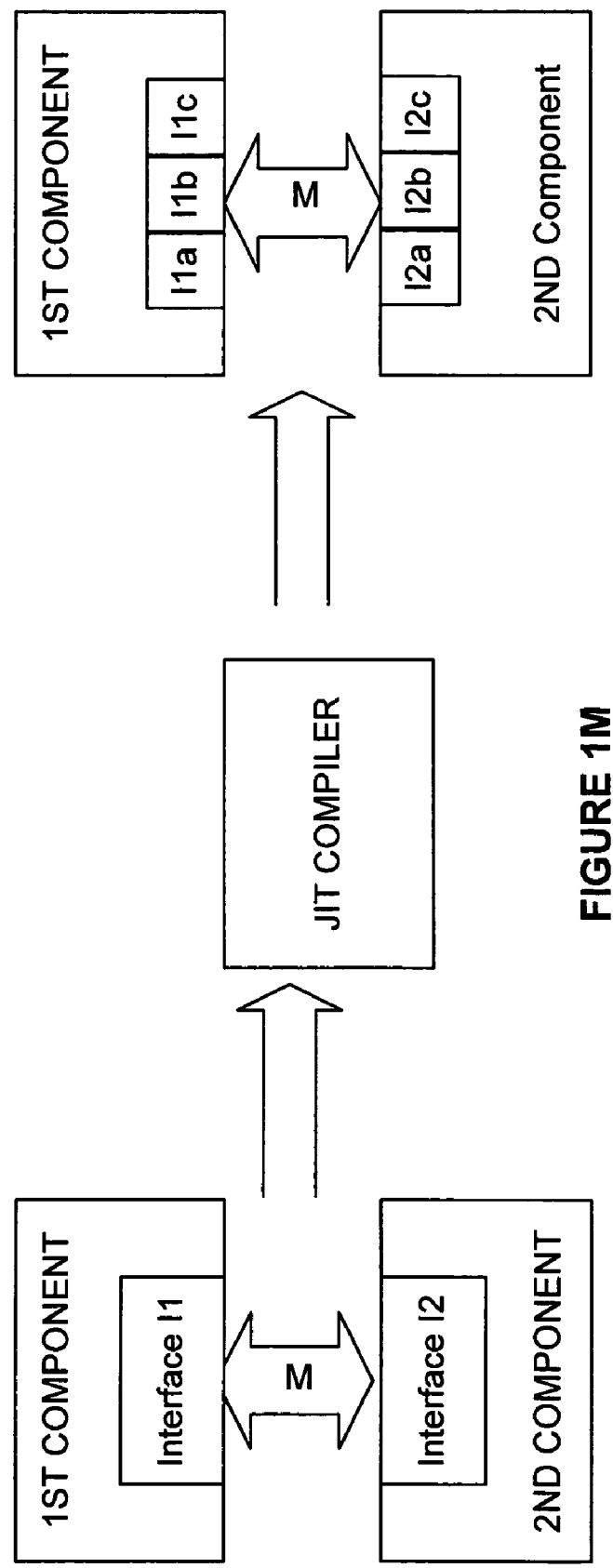

Yet another possible variant is to dynamically rte the code to replace the interface functionality with some else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Internet protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Description of Illustrative Embodiments

Figure 2:
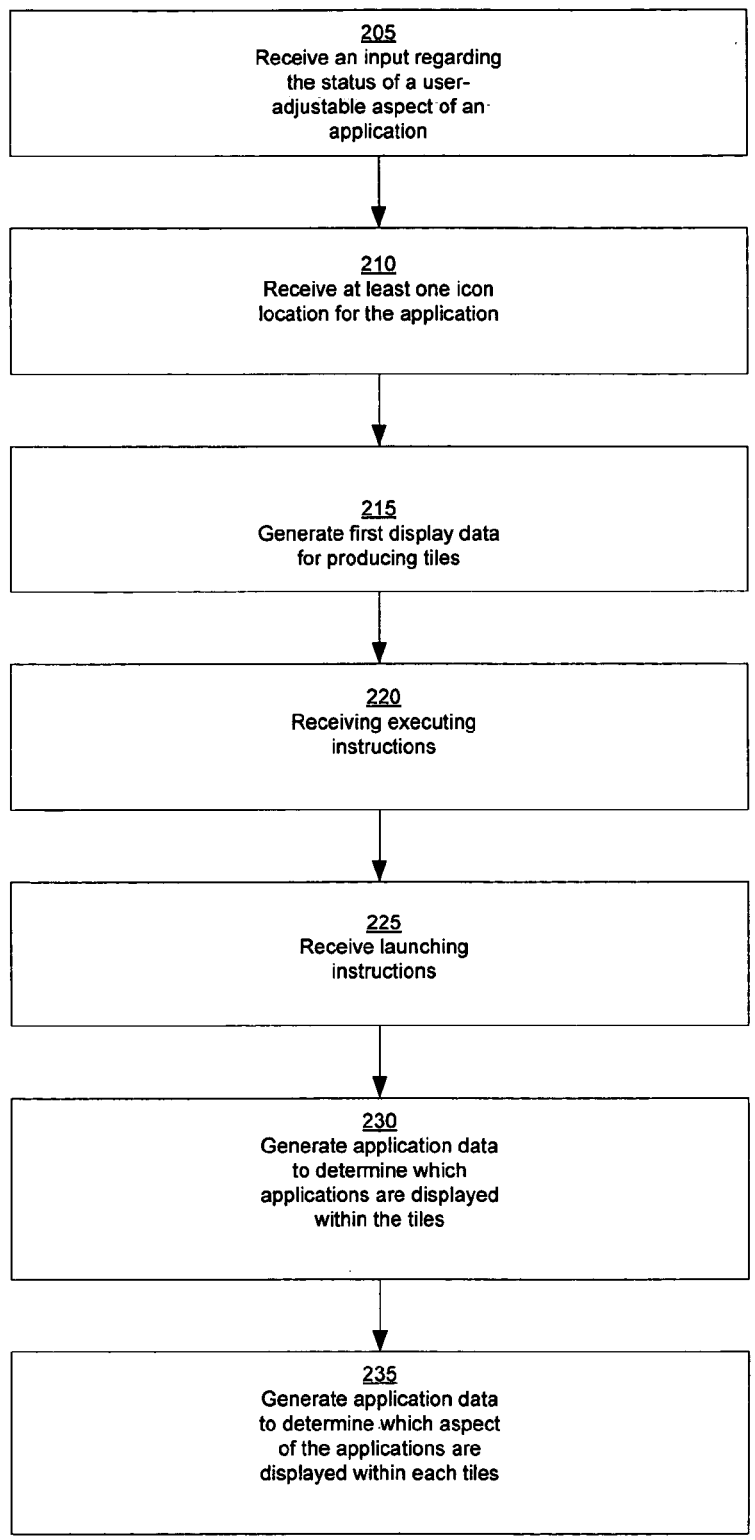
FIG. 2 shows an exemplary method of generating a menu of user-adjustable settings in a computing environment.

FIG. 2 shows an exemplary method of generating a menu of user-adjustable settings in a computing environment. In the illustrative method, an input regarding the status of a user-adjustable aspect for an application available on a computing system is received (step 205). By use of the term "application" it is understood that an application may be software, hardware, firmware, or indeed any computer readable instructions capable of being implemented and adjusted by a user including an operating system, where the user may adjust the system settings. One example of a hardware application may be a video adapter, when the user-selectable aspect may relate to the format of the video signal from the adapter, such as whether the image is portrayed in a landscape or portrait format and/or the resolution of the video output displayed on a display device, such as monitor 107. In such an example, the it of the status may be utilized to create a text message, such as "Portrait—1280×1024" (See step 215, described below); however a graphical representation may be used in place of or in conjunction with a text mess to indicate the status of the user-selectable aspect of the application.

One skilled in the art will understand that there are a large number of icons, or other graphical representations that may be used to reflect the status of the application. Moreover, one skilled in the art will also appreciated that a series of inputs regarding the user-adjustable aspect may be received throughout the process described herein, in which the status may be updated to provide a user an accurate indication of such. The graphical representation of the status may be received in accordance with step 210, which describes the reception of at least one icon.

In step 210, at least one icon location for each application represented in the menu is received. The use of an icon may be desirable in situations receiving an input in step 205 that may only support a textual status indication or where additional graphical representations are desired. The icon location maps to a physical location with a computer readable medium. The computer readable medium may be a local fixed drive, sum as drive 170, or accessed remotely through a network, such as network adapter 114.

The icon includes at least one graphical representation configured to visually display one aspect of the application. For example, if the user-adjustable aspect concerns the layout of a video output, such as through video adapter 108, a plurality of graphical representations may be used to indicate the current positioning of the layout. Similarly, if the user-selectable aspect concerns the power source currently powering the computing device, an icon may comprise a graphical representation of a battery to indicate a battery is currently supplying the energy. In such an example, the status may be updated to prompt the user of the amount of battery power remaining. As discussed above in relation to step 205, this may be done through the use of text, graphical representations, or combinations thereof. In one such embodiment again regarding the power source, the icon may comprise a graphical representation to indicate the current power source is a plug; however, the status input received may still monitor the battery's charge.

In an alternative embodiment of the invention, step 210 may be replaced with a step that includes receiving computer-executable instructions, such as one or more COM objects, that are used to generate an icon. For example, instead of receiving a specific icon location, computer-executable instructions may be received and then used to generate an icon. With respect to a tile representing the state of a battery, the computer-executable instructions may determine the state of the battery and instructions for modifying an existing icon or selecting an icon to represent the state of the battery. If the battery is almost depleted, for example, the computer-executable instructions may change the color of an icon to red to alert the use. The computer-executable instructions may be executed periodically to make any changes to the icons. The use of computer-executable instructions, as opposed to icon locations, provides for greater flexibility when generating tiles.

As one skilled in the art will appreciate, step 210 may occur before, during, and/or after step 205. Indeed, the above examples are only to aid the reader in better understanding aspects of the invention and are not meant to limit the ordering of the steps described throughout the specification. Moreover, it is to be understood that more or fewer steps may be incorporated into the illustrated method without departing from the scope of the invention.

Figure 3:
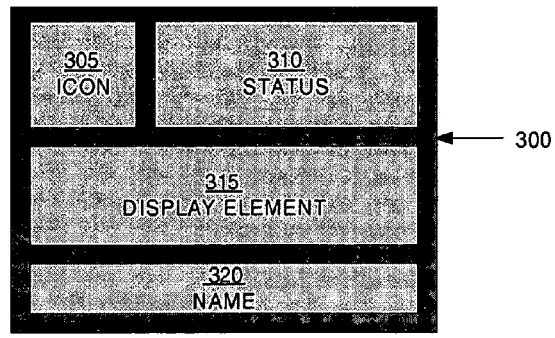
FIG. 3 shows one illustrative tile that may be used in a menu according to one embodiment of the invention.

In step 215, first display data is generated to create a display or used by an application to create a display having a menu comprising tiles. Each tile of the menu is configured to represent an application. FIG. 3 shows one illusive tile that may be used in a menu according to one embodiment of the inaction. As can readily be seen in the figure, tile 300 comprises at least one icon, such as icon 305. Icon 305 is mapped to the icon location received in step 210 described above. The tile 300 also comprises a status display area 310 that displays to a user the status of the application for which the tile represents. In one embodiment, the input received in step 205 is used to determine what status is displayed in the status display area 310. In yet another embodiment, other inputs are used in place of or in conjunction with the input received in step 205 to determine what status is displayed in area 310.

Returning briefly to FIG. 2, executing instructions for allowing a user to adjust the user-adjustable aspect for the application of at least one of the tiles are received in step 220. In one embodiment of the invention, the executing instructions are associated with a first user-selectable display element, such as for usage with a graphical user interface. In such an embodiment, a menu comprising a collection of tiles is displayed to a user, such as through monitor 107, wherein at least one of the tiles is associated with a first use selectable display element (see 315 in FIG. 3). The user-selectable display element may be a button, toggle, check-box, or slidable scale, or indeed any mechanism capable of being displayed to a use and adjusted to duct the state of the inspect or entire application.

The tile may be configured so that upon receiving a selection signal indicative of a user interface selection device, such as a mouse input or keyboard stoke, correlating to selection of the first user selectable display element, the state of the displayed aspect of the tile is adjusted without requiring the use to provide further inputs or navigate through additional menus. One skilled in the at will understand that while the term "mouse" was used to exemplify a user interface selection device, a mouse input may be received from any input device that controls movement of a cursor or other mechanism and allows selection of functions on a computer system device. As used herein, the term "mouse" can encompass a wide variety of input devices that provide an input to a computing device, including, but not limited to: "track pads", "track balls", "scrollers", "joy sticks", "soft buttons" "mouse-pens", "light pens" and other positioning or pointing systems. Moreover, while numerous embodiments may comprise a rotatable ball to provide movement, the present invention is not limited thereto. It will be appreciated by those in the art that various mouse movement sensing alternatives are well known and available, such as mice with optical sensors for sailing mouse movements. Moreover, as described above, the present invention is not limited to a mouse-type input device, but rather is may be utilized with a vast array of input devices for a computer system.

At step 225, launching instructions for utilizing second display data to launch a second display, such as an additional menu, are received for at least one application displayed by one of the tiles. In one embodiment of the invention, to launching instructions are associated with a second user-selectable display element, such as for usage with a graphical use interface. In such an embodiment, a first menu comprising a collection of tiles is displayed to a user, such as through monitor 107, wherein at least one of the tiles is associated with a second user selectable display element in addition to a first user selectable display element as described above. The tile is configured so that upon receiving a selection signal indicative of a user interface selection device correlating to the selection of the second user selectable display element, a second menu is displayed. The second menu may be within the tile or may be initiated independently of the tile and/or the first menu. The second menu comprises additional adjustable aspects associated with the application represented by the particular tile the display element is within. In one embodiment, the icon, such as icon 305 may serve as it user selectable display element.

Select embodiments of the tiles, such as tile 300 may be customized, such as for example, comprising a tile name (see 330). The tile name may be located anywhere within the tile and may be superposed over other parts or elements of the tile. In one embodiment, the tile name may be changed by the user of the computer device.

In yet further embodiments of the invention, a method may be instituted to determine which applications (step 230) and/or elements of applications (step 235) are to be displayed within the menus. In one embodiment, application data may be generated that considers one or more of the following exemplary data categories:

the power source of the computer;
applications presently active on the computer;
the networking environment, applications most utilized on the computer;
applications most likely to be utilized on the computer;
synchronization status
detection of more than one display device operatively connected to the computer; and/or
applications requiring most frequent adjustment.

As one skilled in the art will understand, the above data categories provide only a cursory sampling of the vast array of possible priorities to determine what applications and aspects of those applications to display.

In yet other embodiments, aspect data—data that aids in the determination of the identity of the aspect of a particular application shown in the first menu—may be generated that considers one or more of the following exemplary data categories:

Brightness of at least one display device operatively connected to the computer;
Orientation of at least one display device operatively connected to the computer power source of the computer;
Synchronization status;
Audio volume;
features of at least one application that are most likely to be utilized; and/or
features of at least one application that require the most frequent adjustment.

Figure 4:
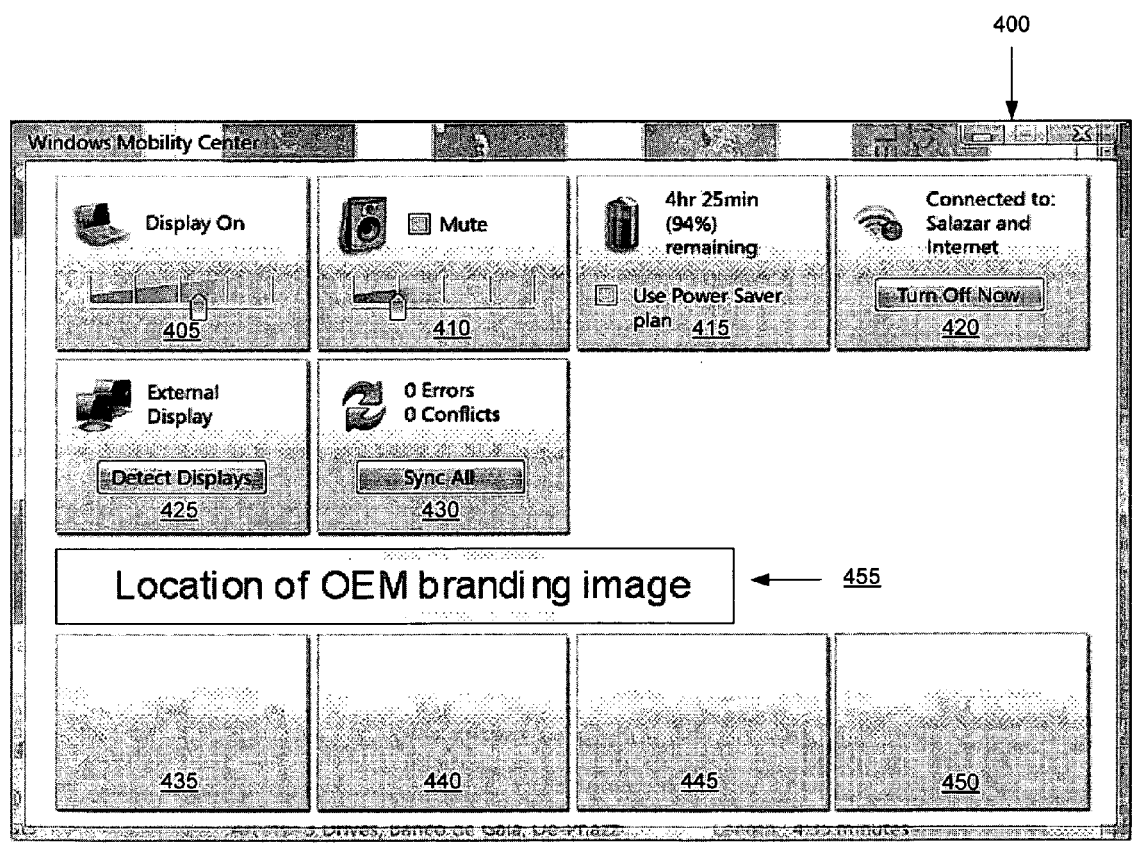
FIG. 4 shows a graphical user interface according to one embodiment of the invention. The illustrative interface may be incorporated through an operating system.

Again, one skilled in the art will understand that the above data categories for possible aspect data provide only a cursory sampling of the vast array of possible priorities to determine what applications and aspects of those applications to display FIG. 4 shows a graphical user intake according to one embodiment of the invention. The illustrative interface may be incorporated through an operating system, such as Microsoft® Windows® operating system. As seen in the figure, a collection of tiles are represented in a menu 405 that is displayed to a user. The menu comprises a collection of tiles, such as tiles 405-430 that each represent a different application available to the user. For example, tile 405 represents a display related application while tile 410 represents an audio related application. As discussed in more detail above, each tile further comprises an icon, an idicia of status of an aspect of the represented application, and at least one user-selectable display element to adjust the aspect of the application.

In one embodiment, a registry key is implemented to direct the computer to the tiles to be used. One exemplary key that may be use to retrieve the proper tiles is Software\Microsoft\MobilePC\MobilityCenter\Tiles, wherein each tile may be represented by a subkey. The ordering of the tiles may be retrieved by a command or registry value and may depend on the default setting, user preferences, or any of the criteria defined above to name a few.

Regarding those embodiments that consider user preferences, the presence of specific tiles and ordering of those tiles may be particularly important to the user. For example, it is well-understood that business travelers are often traveling by airlines. Planes present one environment where a plurality of settings must be viewed and capable of being changed in a relatively short period of time. Planes are often dark, crowded, and generally audio and network capabilities must be disabled or adjusted. The GUI shown in FIG. 4 may take this and other factors into consideration. In one such embodiment, the GUI may be programmed to provide the menu of tiles to the user each time the user powers up the computer. Yet in another embodiment, the menu may be initiated upon an application detecting a change, such as for example, disconnecting from a video or network source. Yet in still another embodiment, the menu may be manually initiated by the user through the use of a dedicated key, hotkey command or other input.

In yet other embodiments, a menu may be shown at the top of a z-order. In still yet further embodiments, the menu may be automatically dismissed and/or closed when a user accesses another application or uses an input device, such as a mouse, to "click" outside of the menu. In those embodiments having a GUI operating within Windows® operating system, the menu may be utilized without consuming valuable space on the task bar or within the programs that may be switched between by the user, for example, when viewing the "applications" available on the Task Manager. Yet in other embodiments, it may be desirable to have the menu available on the task bar or other menus where it may be more readable accessible to the user.

Using the readily accessible menu, the user may view the status of important setting for various applications. Returning again to the plane environment, the user may view tile 415 to determine the available battery power remaining, and with a single input enable the user selectable display element entitled "Use Power Saver plan" to further extend the operating time of the computer. Moreover, the user may "double click" or otherwise select the icon, which may serve as a second user selectable display element, that when selected, opens up an additional menu to allow the user to change battery sources or adjust other aspects of the battery related application.

Us the same menu shown in the GUI of FIG. 4, the user may view tile 410 to determine the level of audio output from an audio component. By providing a single input the use may disable (mute) or lower the output to acceptable levels for that environment using the slidable scale shown in the tile.

In yet other embodiments, an auxiliary display device 199 may also be in communication with computer 100. The auxiliary device may be integrated within the computer (as shown), detachable, or external. The auxiliary display device 199 may optionally be in communication with an auxiliary processor 200, which may be integrated within the auxiliary display or housed within the computer 100. In such embodiments, the user may detect displays by providing a singe input within tile 425 or double click the icon or other mechanism to further adjust settings of the auxiliary display(s).

In still yet further embodiments, the menu of tiles may be configured to allow third-party application vendor or the user to determine what applications are in the tiles. In yet other embodiments, OEMs and/or end-users may have the ability to enable/disable tiles based on supported hardware, personal preference, and other factors. As seen in FIG. 4, tiles 435-450 are currently vacant and may be filed with applications at a later time. For example, when a new application is loaded onto the computer, the user may be prompted as to whether to add a tile to the menu for to new application. Yet in other embodiments, individual OEMs may create a specific tile layout to be used with their specific computers or hardware peripherals. Indeed, according to various embodiments of the invention, OEMs and/or end-users may have the ability to rearrange the layout of the tiles as well as the configuration and display characteristics of the tiles. In one such an embodiment, optional space, 455 may be used to display a branding image or such. Allowing OEMs to modify the menu and/or specific tile characteristics while preserving the similarity of the user experience may be highly desirable in some embodiments. For example, one user of the computer may determine to add a tile of a recently installed application to the menu, whereas another user may determine they would prefer not to have a tile for that application. In one such embodiment, the GUI presented to the first user would remain substantially unchanged except with the difference being the presence of that particular tile for the new application, thus providing a common infrastructure for each user to have a unique user experience without having the relearn different UI frameworks or reapply different settings upon logging in. In this regard, the GUI may be specific to a user or class of users and switch depending on the current user or class of users. In yet another embodiment, a tile representing a newly installed application may be presented to both users but the user-adjustable aspect may differ among each UI presented to various users. In still yet further embodiments, the user-adjustable aspect may remain constant among the UIs presented to the different users; however, the mechanism to adjust the aspect may differ. For example, one user may prefer a smaller tile with a check box while another user may prefer a larger tile clickable button.

The present invention has been described in turns of exemplary embodiments. Numerous other embodiments, modifications and variations within the scope and spirit of the appended claims will occur to persons of ordinary skill in the art from a review of this disclosure.

We claim:

1. A computer readable medium having computer-executable instructions stored thereon that, responsive to execution by a computing device, cause the computing device to perform a method comprising:

receiving a series of inputs regarding a status of user-adjustable aspects for a plurality of system settings;

receiving at least one icon location for each system setting, the icon location being configured to map to a physical location within the computer readable medium comprising at least one graphical representation, the graphical representation being configured to visually display a state of at least one user-adjustable aspect;

generating first display data for tiles in a menu configured to be displayed on a display device, each tile being configured to represent a system setting of the plurality of system settings and a status of the system setting, each tile containing at least one icon that is mapped to the icon location, a first user-selectable display element selectable to adjust the at least one user-adjustable aspect for the system setting, and a second user-selectable display element selectable to cause the menu to be displayed, at least one individual tile being presentable in multiple different user interfaces and with one or more aspects of the at least one individual tile differing among two or more of the multiple different user interfaces;

in response to selection of the first user-selectable display element, receiving executable instructions for allowing a user to adjust the at least one user-adjustable aspect for the system setting; and in response to selection of the second user-selectable display element, causing the menu to be displayed within the tile containing the second user-selectable display element, the menu comprising additional user-adjustable aspects associated with the system setting represented by the tile containing the second user-selectable display element.

2. The computer readable medium of claim 1, wherein receiving the at least one icon location includes receiving a plurality of icon locations for at least one aspect of one system setting, wherein the at least one icon utilized for the tile depends on a state of the system setting.

3. The computer readable medium of claim 1, wherein the at least one system setting comprises a plurality of system settings having at least one hardware system setting and one software system setting.

4. The computer readable medium of claim 1, wherein the first user-selectable display element comprises a slidable scale.

5. The computer readable medium of claim 1, wherein the first user-selectable display element comprises a button.

6. The computer readable medium of claim 1, wherein the at least one icon is configured to be a user-selectable display element configured to cause execution of launching instructions for displaying the menu.

7. The computer readable medium of claim 1, wherein the method further comprises:
generating application data for determining an identity of respective system settings from which the first display data is derived.

8. The computer readable medium of claim 7, wherein the method further comprises:
generating aspect data for determining the identity of an aspect of the respective system settings from which the first display data is derived.

9. The computer readable medium of claim 7, wherein the application data is derived from at least one data category selected from the group consisting of: a power source of the computing device, system settings presently active on the computing device, a networking environment, system settings most utilized on the computing device, a synchronization status, system settings most likely to be utilized on the computing device, system settings requiring most frequent adjustment, and combinations thereof.

10. The computer readable medium of claim 8, wherein the aspect data is derived from at least one data category selected from the group consisting of: a power source of the computing device, aspects of system settings presently active on the computing device, a networking environment, aspects of system settings most utilized on the computing device, aspects of system settings most likely to be utilized on the computing device, a brightness of at least one display device operatively connected to the computing device; an orientation of at least one display device operatively connected to the power source of the computing device, a synchronization status, an audio volume, and combinations thereof.

11. The computer readable medium of claim 1, wherein the first and second user display elements further include a mechanism of selection that can be changed by the user.

12. A computer having a processor and a computer readable medium, the computer readable medium comprising instructions that, when executed by the processor, cause the computer to implement a system comprising:
a first menu comprising a plurality of tiles, one or more of the tiles having at least one graphical representation, the at least one graphical representation configured to visually display at least one state of a user-adjustable aspect of one of a plurality of system settings available to a user, the first menu being configured to substantially fill a graphical user interface when displayed for the user, each tile further containing:
a first user-selectable display element that is configured to, when selected, adjust the user-adjustable aspect displayed on a respective tile; and
a second user-selectable display element that is configured to, when selected, cause a second menu to be displayed, the second menu comprising additional adjustable aspects associated with a system setting represented by the respective tile within which the second user-selectable display element is displayed; and
at least one tile configured to be presented to different users of the computer with one or more aspects of the at least one tile differing among two or more of the different users, the one or more differing aspects of the at least one tile including the first user-selectable display element or the second user-selectable display element.

13. The computer of claim 12, wherein the at least one graphical representation in the first menu comprises an icon.

14. The computer of claim 13, wherein the icon is the second user-selectable display element.

15. The computer of claim 12, wherein the computer readable medium further contains instructions for displaying an indicia representing a current status of the user-adjustable aspect of the system setting represented by the respective tile.

16. The computer of claim 12, wherein the computer readable medium further contains instructions for deriving the user-adjustable aspect from at least one data category selected from the group consisting of: a power source of the computer, aspects of system settings presently active on the computer, a networking environment, aspects of system settings most utilized on the computer, aspects of system settings most likely to be utilized on the computer, aspects of system settings requiring most frequent adjustment, and combinations thereof.

17. The computer of claim 12, wherein the first and second user display elements further include a mechanism of selection that can be changed by the user.

* * * * *